United States Patent
Chang (10) Patent No.: US 8,009,813 B2
(45) Date of Patent: Aug. 30, 2011

(54) TELEPHONE USER INTERFACE PROGRAMMABLE SHORTCUT

(75) Inventor: Francis Chang, Los Altos, CA (US)

(73) Assignee: Siemens Enterprise Communications, Inc., Boca Raton, FL (US)

(*) Notice: Subject to any disclaimer, the term of this patent is extended or adjusted under 35 U.S.C. 154(b) by 1502 days.

(21) Appl. No.: 11/205,369

(22) Filed: Aug. 16, 2005

(65) Prior Publication Data

US 2007/0041569 A1    Feb. 22, 2007

(51) Int. Cl.
*H04M 11/00* (2006.01)
*H04M 1/64* (2006.01)
*H04M 3/42* (2006.01)

(52) U.S. Cl. .............. 379/88.18; 379/88.17; 379/201.03

(58) Field of Classification Search .............. 379/76, 379/88.01, 88.03, 88.04, 88.17, 88.18, 201.03, 379/355.01; 455/418, 419
See application file for complete search history.

(56) References Cited

U.S. PATENT DOCUMENTS

| | | | |
|---|---|---|---|
| 6,173,194 B1 | 1/2001 | Vanttila | 455/566 |
| 6,757,372 B1 | 6/2004 | Dunlap et al. | 379/142.17 |
| 6,778,642 B1 | 8/2004 | Shcmidt, Jr. et al. | 379/88.13 |
| 7,103,158 B2 * | 9/2006 | Plan | 379/88.23 |
| 7,515,695 B1 * | 4/2009 | Chan et al. | 379/88.18 |
| 7,526,081 B1 * | 4/2009 | Vashisht et al. | 379/433.06 |
| 2002/0044642 A1 * | 4/2002 | Danner et al. | 379/355.01 |
| 2006/0242248 A1 * | 10/2006 | Kokkinen | 709/206 |

* cited by examiner

*Primary Examiner* — Quoc D Tran (57) ABSTRACT

A method for providing a telephone user interface programmable shortcut for a telephone-accessed system includes steps as follows. The telephone user interface programmable shortcut is mapped to a telephone key stroke sequence. The telephone-accessed system is dialed into via a telephone. The telephone key stroke sequence is pressed by the telephone-accessed system when the telephone user interface programmable shortcut is activated via the telephone.

17 Claims, 5 Drawing Sheets

TELEPHONE USER INTERFACE PROGRAMMABLE SHORTCUT

BACKGROUND OF THE INVENTION

The present invention relates generally to telephone-accessed systems, and more particularly to a system and method for providing a telephone user interface programmable shortcut for a telephone-accessed system.

Telephone-accessed automated systems have become increasingly more sophisticated. For example, with a unified messaging system, a user may receive multiple media message types (e.g., voice messages, e-mails, faxes, and the like), all in a single mailbox. Access to these messages is normally provided from a desktop PC (similar to the way emails are accessed via a graphical user interface) and/or from a telephone in the manner that voice messages are accessed via a telephone user interface (TUI). The widespread use of cell phones has increased the importance of providing a simple-to-use TUI for navigating through a messaging system. Unfortunately, the enhanced message handling capabilities of unified messaging systems has led to more complexity in the TUI menus for these systems, which is a trend that runs contradictory to the needs of the cell phone user.

Consequently, it would be desirable to provide a method and system which may address the user need for a simplified telephone user interface to a telephone-accessed system.

SUMMARY OF THE INVENTION

In an exemplary embodiment of the present invention, a method for providing a telephone user interface programmable shortcut for a telephone-accessed system includes steps as follows. The telephone user interface programmable shortcut is mapped to a telephone key stroke sequence. The telephone-accessed system is dialed into via a telephone. The telephone key stroke sequence is pressed by the telephone-accessed system when the telephone user interface programmable shortcut is activated via the telephone.

In an additional exemplary embodiment of the present invention, a method for providing telephone user interface programmable shortcuts for a telephone-accessed system includes steps as follows. A first telephone user interface programmable shortcut is mapped to a first telephone key stroke sequence. The first telephone user interface programmable shortcut is a first number starting with a beginning digit. A second telephone user interface programmable shortcut is mapped to a second telephone key stroke sequence. The second telephone user interface programmable shortcut is a second number starting with the beginning digit. The telephone-accessed system is dialed into via a telephone. The first telephone key stroke sequence is pressed by the telephone-accessed system when the first telephone user interface programmable shortcut is activated via the telephone.

In another exemplary embodiment of the present invention, a telephone-accessed system for providing a telephone user interface programmable shortcut associated with a telephone key stroke sequence includes a telephone and a server, which is communicatively coupled to the telephone. The server is suitable for storing the telephone key stroke sequence, where the telephone key stroke sequence is pressed by the telephone-accessed system when the telephone user interface programmable shortcut is activated via the telephone.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF SPECIFIC EMBODIMENTS

Reference will now be made in detail to the presently preferred embodiments of the invention, examples of which are illustrated in the accompanying drawings.

A telephone-accessed system is a system which a user may access through a TUI by pressing keys on a telephone. A telephone-accessed system may be a telephone-accessed messaging system, a telephone-accessed computer system, or the like. Through a TUI, a user may access a telephone-accessed system to manipulate information such as voice messages, e-mails, faxes, retirement account information, personal bank account information, and the like.

In one embodiment, the TUI programmable shortcuts feature of the present invention may address a user's need for a simplified TUI to a telephone-accessed system and may simplify and streamline a user's experience when he or she accesses a telephone-accessed system via a TUI. Using a web-based programming screen for a telephone-accessed system, a 2-digit shortcut may be mapped to a sequence of up to 63 telephone key strokes and may be assigned a short descriptive name. When a caller dials into the system via a telephone and presses the 2-digit shortcut, the system may behave as if the caller is pressing the sequence of up to 63 key strokes. Several of these 2-digit shortcuts may be programmed. If the caller presses only the first digit of the shortcuts on his or her telephone, the system may provide a Text-to-Speech playback of the descriptive name associated with each of the shortcuts available.

Figure 1:
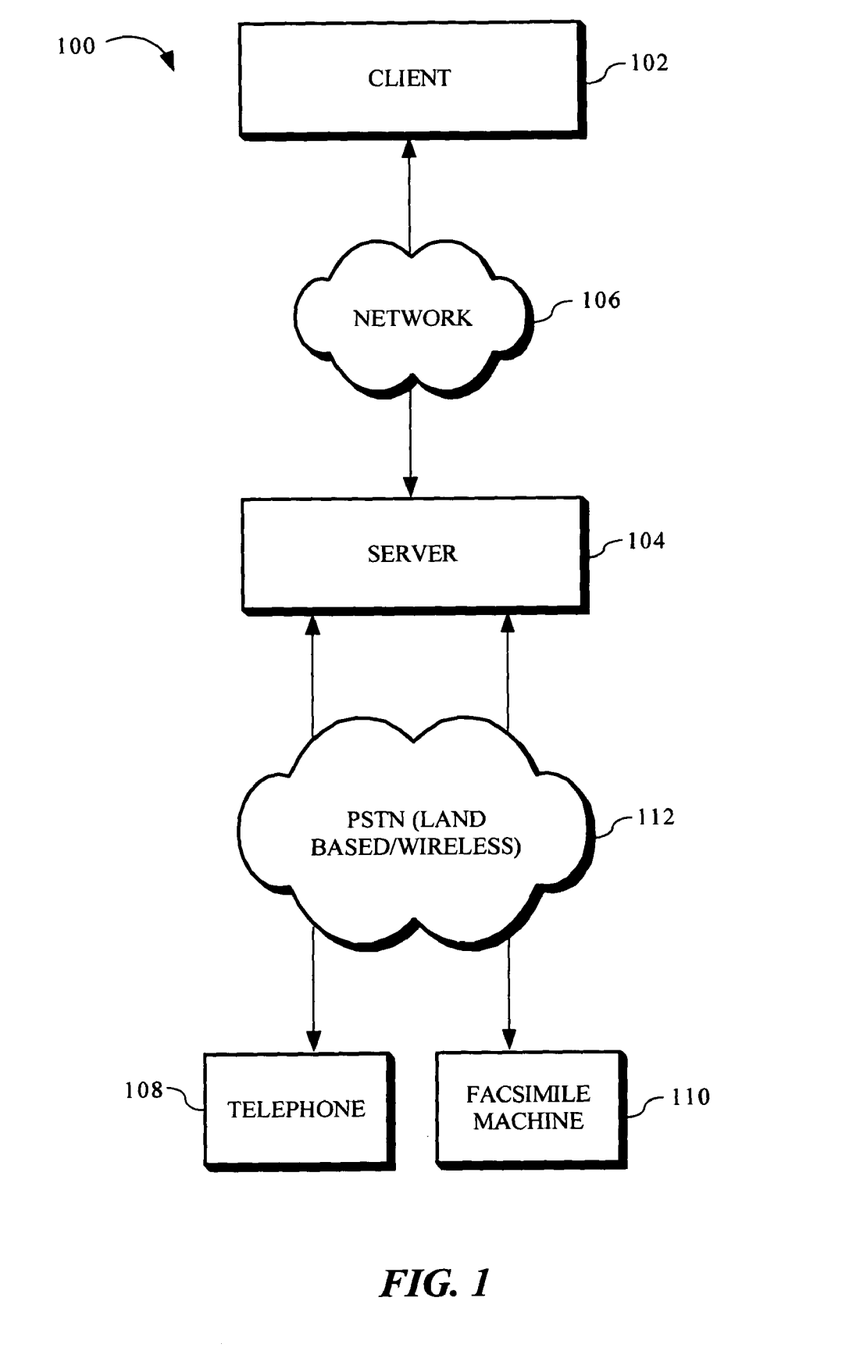
FIG. 1 is a block diagram illustrating a telephone-accessed system in which the present invention may be implemented.

Referring now to FIG. 1, a telephone-accessed system 100 in which the present invention may be implemented is shown. The telephone-accessed system 100 may be a telephone-accessed messaging system, a telephone-accessed computer system, or the like. In one embodiment, the telephone-accessed system 100 is a unified messaging system. The system 100 may include a client 102 and a server 104 connected via a computer network (e.g., the Internet, intranet, or the like) 106, and a telephone (e.g., a land based telephone, a cell phone, or the like) 108 and a facsimile machine 110 connected to the server 104 via a Public Switched Telephone Network ("PSTN") 112. The PSTN is the concatenation of the world's public circuit-switched telephone networks and includes cellular (mobile) and fixed (land based) telephones. The client 102 may include any mechanism capable of communicating over the network 106, including, for example, a personal computer, a personal digital assistant (PDA), or a thin client such as a network computer. Accordingly, a user may access the server 104 using an Internet connection such as a TCP/IP compliant application running on the client 102, or a user may use an application that permits the user to dial into the server 104 using conventional telephone lines.

FIG. 1 shows only one client, one telephone, and one facsimile machine connected to the server for simplicity. One skilled in the art would recognize that additional clients, telephones, and facsimile machines may connect to the server 104 in a number of different ways. For example, a user may use the telephone 108 to dial into the server 104 via the PSTN 112 to leave a voice mail for another user. In addition, a user may retrieve email messages or facsimile messages using the client 102. Although FIG. 1 depicts the client 102 connected to the server 104 via the network 106, a client such as a personal computer may connect to the server 104 via a land based or wireless connection through the PSTN 112. Moreover, a user may also access the messages stored on the server 104 using other devices such as cellular telephones, and other wireless devices such as two-way paging devices.

The server 104 receives all types of messages, including voice mail messages, electronic mail messages, and facsimile messages, and stores these messages for later retrieval by users. Thus, a user may send a facsimile message to another user which may be stored on the server 104 such that another user may access the stored message using any of the clients connected to the server 104.

In an embodiment of the present invention, the system 100 may provide a telephone user interface programmable shortcut associated with a telephone key stroke sequence. The telephone user interface programmable shortcut may be a number including multiple digits. For example, the telephone user interface programmable shortcut may be a 2-digit number (e.g., 45). The telephone key stroke sequence may be a combination of telephone key pad digits 1-9, * and # (e.g., 85110##9) or a single telephone key pad digit (e.g., 3). The server 104 may store the telephone key stroke sequence. When the telephone user interface programmable shortcut is later activated via a telephone (e.g., when a user presses the short cut "45" on his or her telephone), the stored telephone key stroke sequence may be pressed by the system 100 automatically. This way, a user's need for a simplified TUI to a telephone-accessed system is addressed, and a user's experience when he or she accesses a telephone-accessed system via a TUI is simplified and streamlined.

Figure 2:
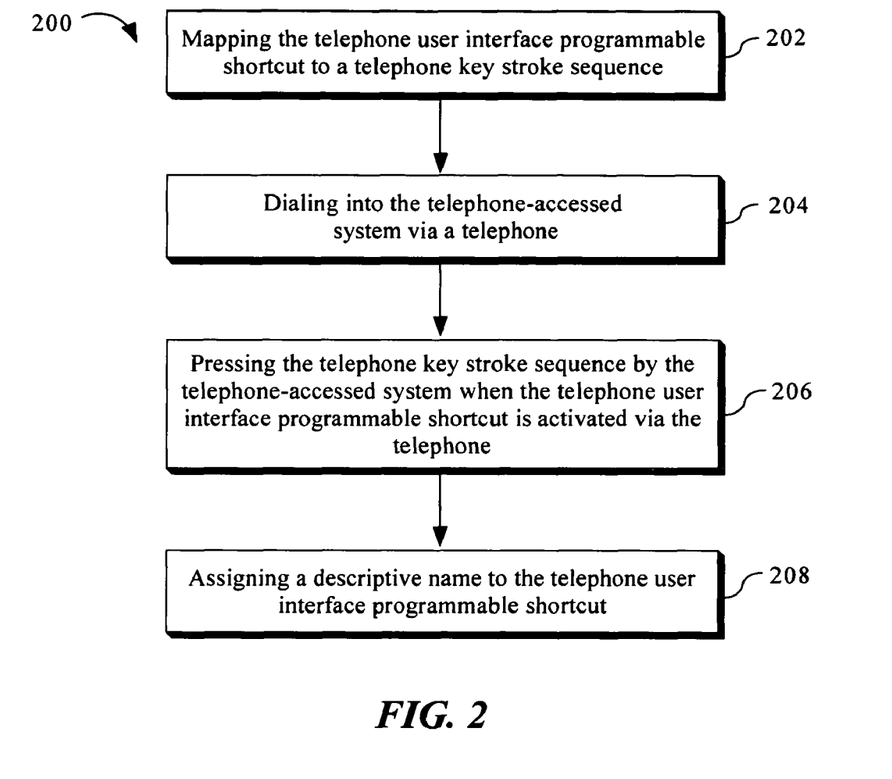
FIG. 2 is a flowchart of a method for providing a telephone user interface programmable shortcut for a telephone-accessed system in accordance with an exemplary embodiment of the present invention, where the method includes a step of mapping the telephone user interface programmable shortcut to a telephone key stroke sequence.
Figure 3:
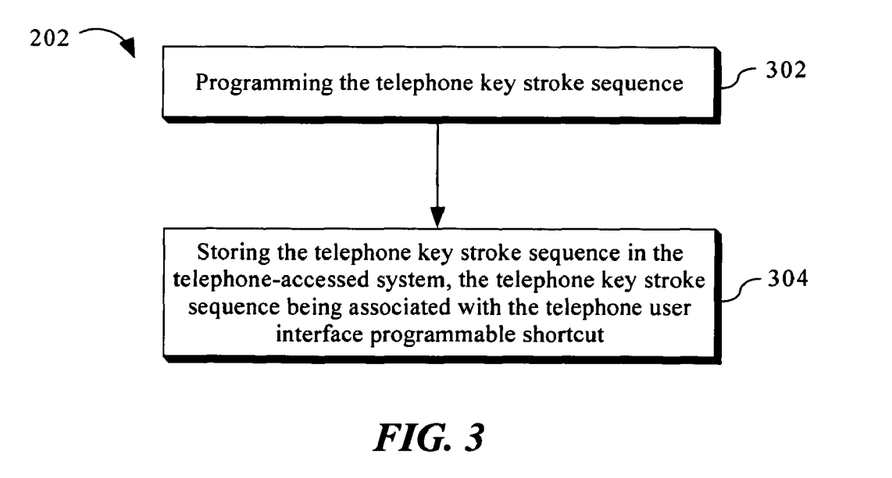
FIG. 3 is a flowchart illustrating the mapping step shown in FIG. 2 in accordance with an exemplary embodiment of the present invention.

FIG. 2 is a flowchart of a method 200 for providing a telephone user interface programmable shortcut for a telephone-accessed system. The method 200 may be implemented in the telephone-accessed system 100 shown in FIG. 1. The telephone user interface programmable shortcut is mapped to a telephone key stroke sequence 202. In an exemplary embodiment, the step 202 may be implemented as shown in FIG. 3. The telephone key stroke sequence is programmed 302. For example, the telephone key stroke sequence may be programmed via a web-based user administration utility (e.g., Web Assistant within the Siemens HiPath Xpressions messaging system, or the like). The web-based user administration utility may allow key pad digits 1-9, * and # on the telephone to be used for the telephone key stroke sequence. The telephone key stroke sequence is stored in the telephone-accessed system, where the telephone key stroke sequence is associated with the telephone user interface programmable shortcut 304.

The telephone-accessed system is dialed into via a telephone 204. The telephone key stroke sequence is pressed by the telephone-accessed system when the telephone user interface programmable shortcut is activated via the telephone 206. A descriptive name may be assigned to the telephone user interface programmable shortcut 208. For example, the descriptive name may be "Receive Message", "Send Message", or the like.

Figure 4:
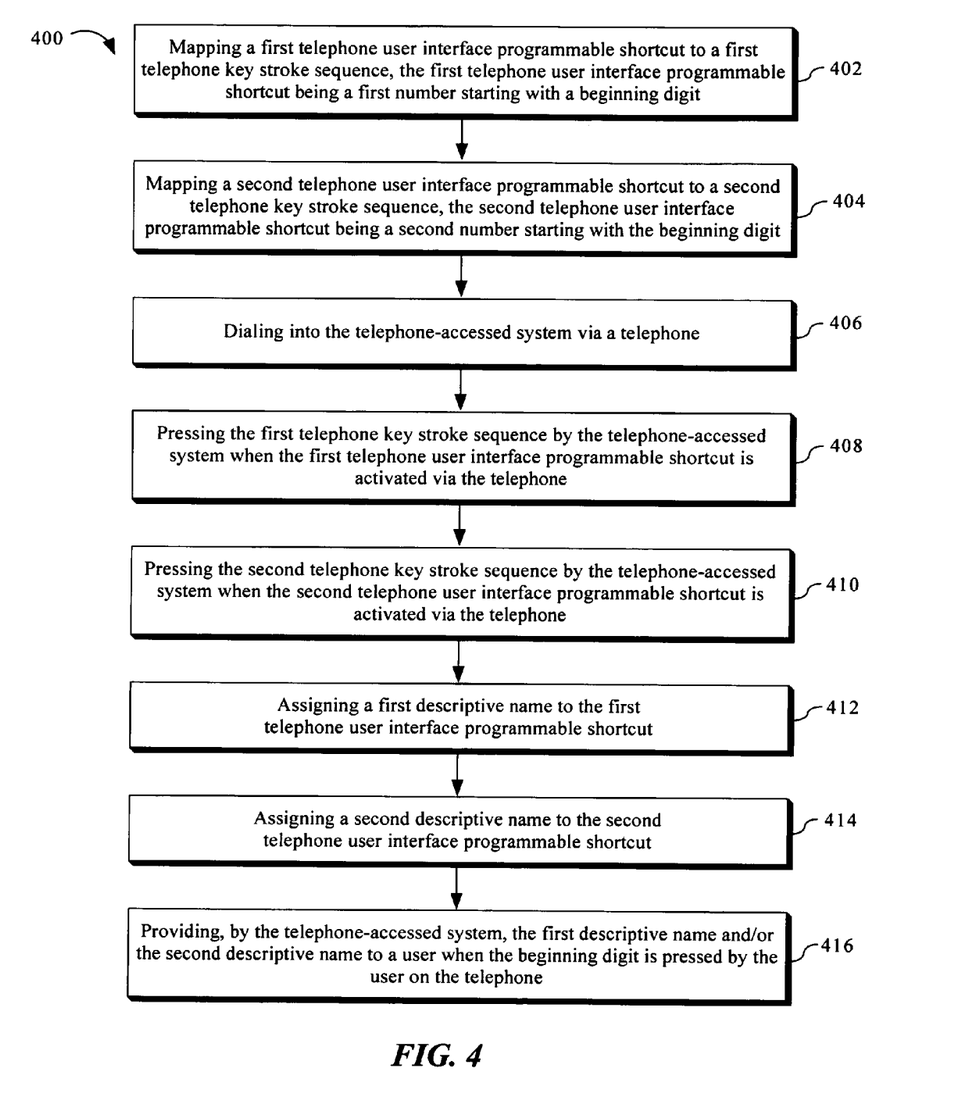
FIG. 4 is a flowchart of a method for providing telephone user interface programmable shortcuts for a telephone-accessed system in accordance with an exemplary embodiment of the present invention, where the method includes a step of providing, by the telephone-accessed system, a first descriptive name and/or a second descriptive name to a user when a beginning digit is pressed by the user on a telephone.

FIG. 4 is a flowchart of a method 400 for providing telephone user interface programmable shortcuts for a telephone-accessed system. The method 400 may be implemented in the telephone-accessed system 100 shown in FIG. 1. A first telephone user interface programmable shortcut is mapped to a first telephone key stroke sequence, where the first telephone user interface programmable shortcut is a first number starting with a beginning digit 402. A second telephone user interface programmable shortcut is mapped to a second telephone key stroke sequence, where the second telephone user interface programmable shortcut is a second number starting with the same beginning digit 404. The steps 402 and 404 each may be implemented similar to the foregoing described step 202 shown in FIG. 3. The telephone-accessed system is dialed into via a telephone 406. The first telephone key stroke sequence is pressed by the telephone-accessed system when the first telephone user interface programmable shortcut is activated via the telephone 408. The second telephone key stroke sequence is pressed by the telephone-accessed system when the second telephone user interface programmable shortcut is activated via the telephone 410. A first descriptive name may be assigned to the first telephone user interface programmable shortcut 412. A second descriptive name may be assigned to the second telephone user interface programmable shortcut 414. When the beginning digit is pressed by a user via the telephone, the first descriptive name and/or the second descriptive name may be provided to a user by the telephone-accessed system 416.

Figure 5:
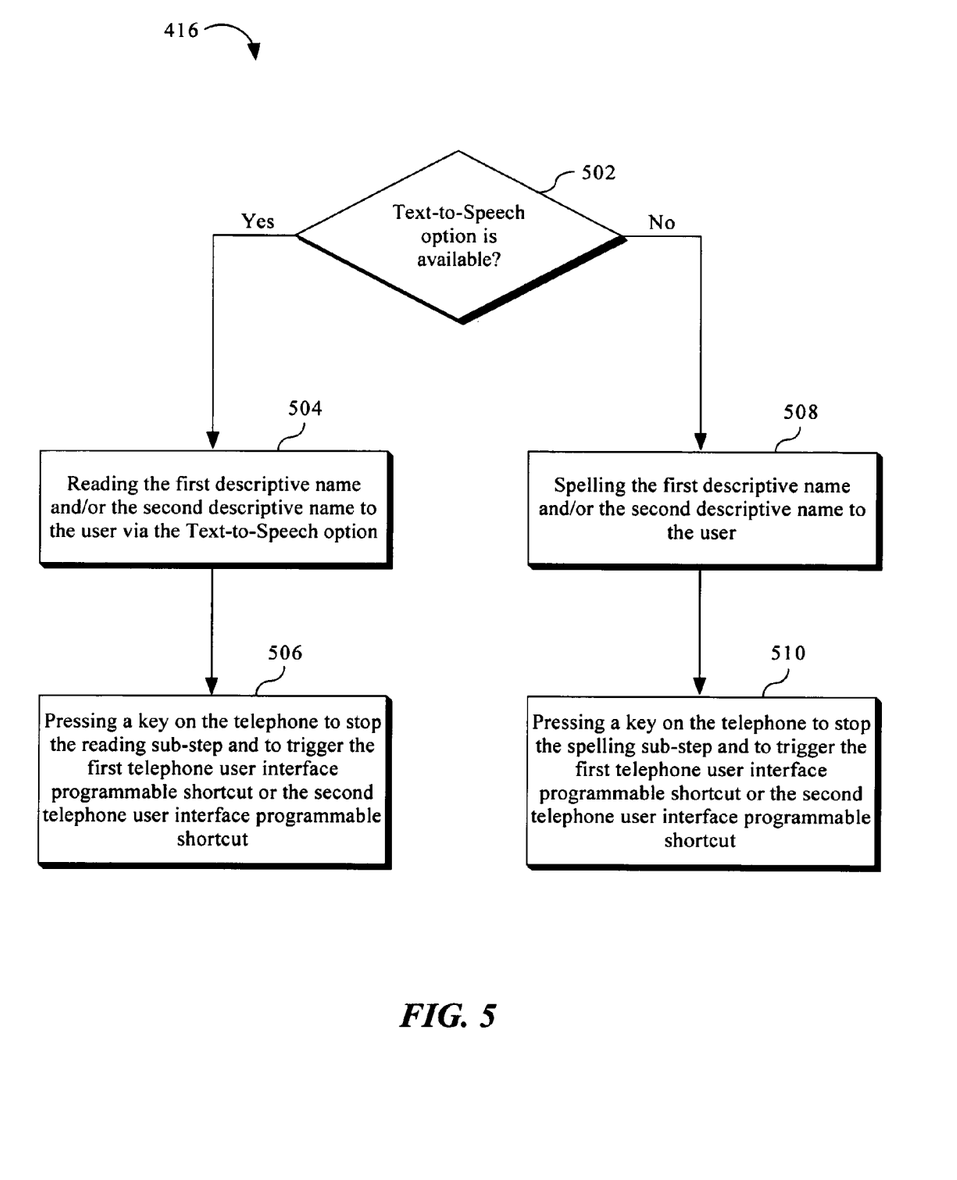
FIG. 5 is a flowchart illustrating the providing step shown in FIG. 4 in accordance with an exemplary embodiment of the present invention.

FIG. 5 shows an exemplary embodiment of the step 416 shown in FIG. 4. It is checked whether a Text-to-Speech option is available on the telephone-accessed system 502. If the answer is yes, the first descriptive name and/or the second descriptive name may be read to the user via the Text-to-Speech option 504, and the user may interrupt the step 504 at any time by pressing a key on the telephone to trigger either the first telephone user interface programmable shortcut or the second telephone user interface programmable shortcut 506; if the answer is no, the first descriptive name and/or the second descriptive name may be spelled to the user 508, and the user may interrupt the step 508 at any time by pressing a key on the telephone to trigger either the first telephone user interface programmable shortcut or the second telephone user interface programmable shortcut 510.

The present invention may be described using the Siemens HiPath Xpressions messaging system as an example.

When a user dials the Direct Access number for HiPath Xpressions in Version 3.0, the user is prompted as follows:
To listen, push 3
Record, push 1
Change answering options, push 8
Change mailbox options, push 9
Transfer, push 7 then 0
Disconnect, push 7 then 6

The "4" key is not used for any purpose at this top level of the TUI tree. Thus, in Version 4.0, the "4" key may be put to work. The beginning digit "4", followed by one of the digits 1-9, may thus provide 9 telephone user interface programmable shortcut paths for the user (0 is used for Help). A user may program separate shortcut key sequences and store them in locations assigned to paths "41, 42, . . . , 49" on a server of the messaging system. Then, if the user activates a path by pressing "4x", HiPath Xpressions may follow the programmed key sequence just as if the user were entering the digits on the telephone keypad.

Figure 6:
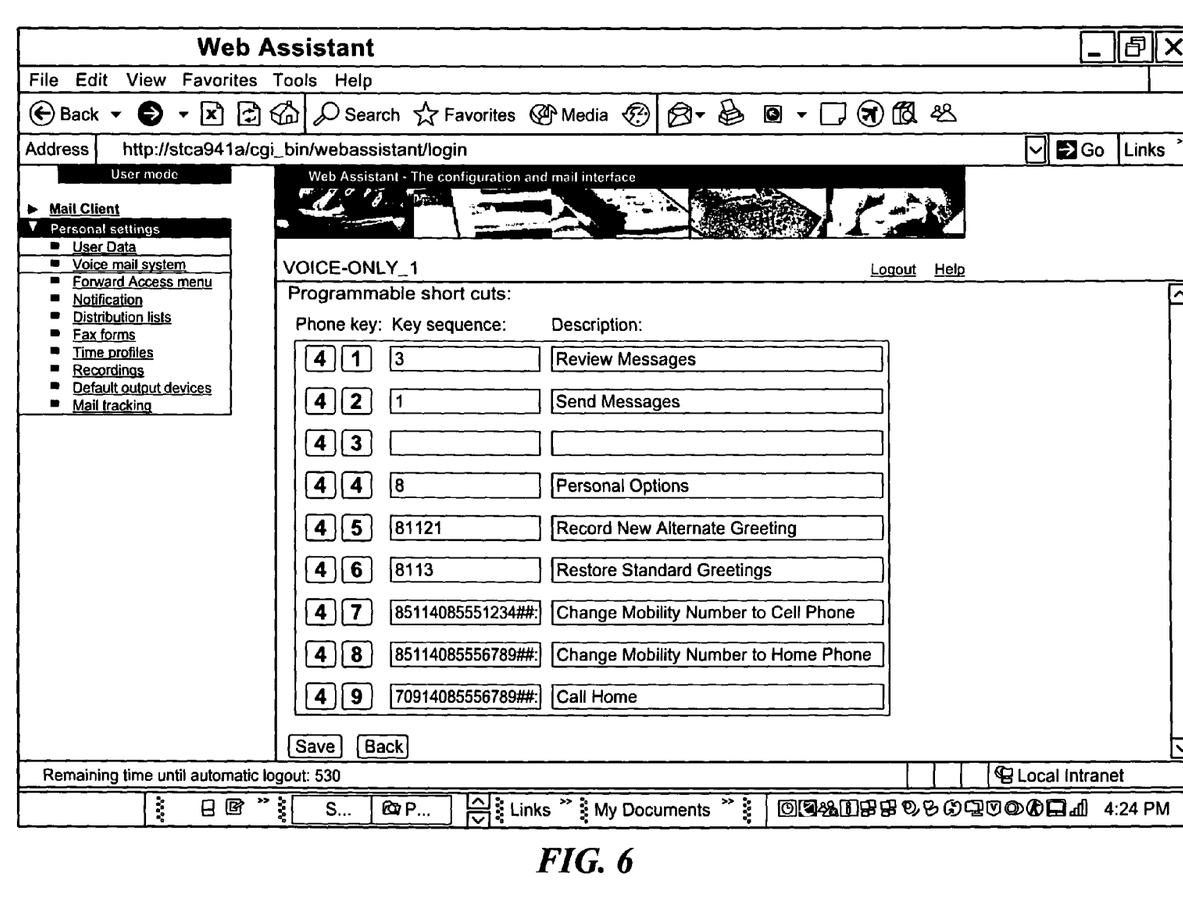
FIG. 6 is a schematic diagram of a screen of a web-based user administration utility used for programming telephone user interface programmable shortcuts for a telephone-accessed system in accordance with an exemplary embodiment of the present invention.

The key sequence (i.e., telephone key stroke sequence) for each of the shortcut paths may be programmed in the Web Assistant (WA)—the web-based user administration utility within HiPath Xpressions. FIG. 6 is a schematic diagram illustrating a screen of the WA used for programming telephone user interface programmable shortcuts for a telephone-accessed system. There is error checking that only telephone keypad digits (1-9, *, #) are entered in the WA when programming a key sequence. Under the "Voice Mail System Setting" link in the WA, each shortcut (40, 41, . . . , 49) may be enabled and programmed. The key sequence may be typed in like a string of dialed digits.

Each telephone user interface programmable shortcut (or shortcut) may be mapped to a key sequence of up to 63 keys. The descriptions may be assigned by the user. The descriptions are not only important to the user when in the WA but also when accessing the shortcuts via the TUI. If the TUI user forgets what each of the shortcuts does, the user may press the beginning digit "4", and HiPath Xpressions may provide the description to the user. If the Text-to-Speech (TTS) option is available on the messaging system, the description may be read via TTS. If the system does not have TTS, the description may be spelled to the user. The user may interrupt at any time by pressing a key to trigger a specific shortcut.

The present invention may be used to change a Mobility destination. The Mobility feature of HiPath Xpressions allows a user to designate a phone number as a "mobility destination" to which a caller may be forwarded by pressing a "mobility key" (normally the "7" key) while listening to the user's greeting. When the mobility key is pressed by the caller, HiPath Xpressions redirects the caller to the mobility destination. Typically, this destination is the user's cell phone. However, the user may need to have an alternative mobility destination when working from a location where the cellular signal is weak. Or the user may desire to have multiple mobility destinations pre-programmed and desire to activate each destination as needed.

For example, a user is assumed to alternate between two Mobility destinations: Cellphone # (408) 555-1234 and Home # (408) 555-6789. Two shortcuts may be programmed to switch between these destinations. As shown in FIG. 6, the shortcut "47" may be mapped to the key sequence 8-5-1-14085551234##2, where
8=Change answering options
5=Mobility number
1=Change number to
14085551234=Cellphone number
=Confirm cellphone number as new Mobility number
2=Activate new Mobility number
and the shortcut "48" may be mapped to the key sequence 8-5-1-14085556789##2, where
8=Change answering options
5=Mobility number
1=Change number to
14085556789=Home number
=Confirm home number as new Mobility number
2=Activate new Mobility number Users migrating from non-Siemens messaging systems to HiPath Xpressions may initially complain about the need to learn a new TUI. With the present TUI programmable shortcuts feature, these users may program the various "4x" paths to make at least the top level of the TUI more similar to what they are used to. For example, the "Review Messages" key is "3" for HiPath Xpressions but may be "1" for another non-Siemens system. Thus, a user may map the shortcut "41" to the key sequence 3 in order to send the user to message playback mode (see FIG. 6). Similar programming may be performed for the "Send Messages", "Personal Options" and other functions which map to the HiPath Xpressions top level TUI.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not necessarily meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing a telephone user interface programmable shortcut for a telephone-accessed system, comprising steps of:
presenting a web-based user interface, the web-based user interface configured for receiving the telephone user interface programmable shortcut for a telephone key stroke sequence, the web-based user interface including a field for receiving the telephone key stroke sequence and a second field for receiving a textual description corresponding with the telephone user interface programmable shortcut;
mapping the telephone user interface programmable shortcut to the telephone key stroke sequence, the telephone user interface programmable shortcut consisting of two digits, the telephone user interface programmable shortcut of two digits selected from 1-9, * and #, the telephone key stroke sequence being any sequence of a plurality of digits, the plurality of digits including 1-9, * and # entered by a user, the mapping step comprises sub-steps of:
programming the telephone key stroke sequence; and
storing the telephone key stroke sequence in the telephone-accessed system, the telephone key stroke sequence being associated with the telephone user interface programmable shortcut;

receiving a request to access the telephone-accessed system via a telephone, the telephone-accessed system remote to said telephone; and initiating the telephone key stroke sequence by the telephone-accessed system when the telephone user interface programmable shortcut is activated via the telephone, wherein the telephone key stroke sequence includes a telephone number, a change of mobility number and review of messages.

2. The method as claimed in claim 1, further comprises a step of assigning the textual description to the telephone user interface programmable shortcut.

3. The method as claimed in claim 1, wherein the programming sub-step is implemented via a web-based user administration utility.

4. The method as claimed in claim 1, further comprising:

providing a text-to-speech playback of the textual description associated with the telephone user interface programmable shortcut upon activation of a first digit of the telephone user interface programmable shortcut.

5. A method for providing telephone user interface programmable shortcuts for a telephone-accessed system, comprising steps of:

presenting a web-based user interface, the web-based user interface configured for receiving a first telephone user interface programmable shortcut for a first telephone key stroke sequence and a second telephone user interface programmable shortcut for a second telephone key stroke sequence, the web-based user interface including a field for receiving the first telephone key stroke sequence, a second field for receiving a first textual description corresponding with the first telephone user interface programmable shortcut, a third field for receiving the second telephone key stroke sequence and a fourth field for receiving a second textual description corresponding with the second telephone user interface programmable shortcut;

mapping the first telephone user interface programmable shortcut to the first telephone key stroke sequence, the first telephone user interface programmable shortcut consisting of two digits and the first telephone user interface programmable shortcut and the second telephone user interface programmable shortcut including a beginning digit, the first telephone user interface programmable shortcut of two digits selected from 1-9, * and #, the first telephone key stroke sequence being any sequence of a plurality of digits, the plurality of digits including 1-9, * and # entered by a user;

mapping the second telephone user interface programmable shortcut to the second telephone key stroke sequence, the second telephone user interface programmable shortcut consisting of two digits and the second telephone user interface programmable shortcut starting with the beginning digit, the telephone user interface programmable shortcut of two digits selected from 1-9, * and #, the second telephone key stroke sequence being any sequence of a plurality of digits, the plurality of digits including 1-9, * and # entered by a user;

receiving a request to access the telephone-accessed system via a telephone; and initiating the first telephone key stroke sequence by the telephone-accessed system when the first telephone user interface programmable shortcut is activated via the telephone, wherein the telephone key stroke sequence includes a telephone number, a change of mobility number and review of messages.

6. The method as claimed in claim 5, further comprises a step of initiating the second telephone key stroke sequence by the telephone-accessed system when the second telephone user interface programmable shortcut is activated via the telephone.

7. The method as claimed in claim 6, further comprises steps of:

assigning the first textual description to the first telephone user interface programmable shortcut; and assigning the second textual description to the second telephone user interface programmable shortcut.

8. The method as claimed in claim 7, further comprises a step of providing, by the telephone-accessed system, at least one of the first textual description or the second textual description to a user when the beginning digit is pressed by the user on the telephone.

9. The method as claimed in claim 8, wherein the providing step comprises a sub-step of reading the at least one of the first textual description or the second textual description to the user via a Text-to-Speech option when the Text-to-Speech option is available on the telephone-accessed system.

10. The method as claimed in claim 9, wherein the providing step further comprises a sub-step of receiving a request via the telephone to stop the reading sub-step and to trigger the first telephone user interface programmable shortcut or the second telephone user interface programmable shortcut.

11. The method as claimed in claim 8, wherein the providing step comprises a sub-step of spelling the at least one of the first textual description or the second textual description to the user when a Text-to-Speech option is not available on the telephone-accessed system.

12. The method as claimed in claim 11, wherein the providing step further comprises a sub-step of pressing a key on the telephone to stop the spelling sub-step and to trigger the first telephone user interface programmable shortcut or the second telephone user interface programmable shortcut.

13. The method as claimed in claim 5, wherein the step of mapping a first telephone user interface programmable shortcut to a first telephone key stroke sequence comprises sub-steps of:

programming the first telephone key stroke sequence; and storing the first telephone key stroke sequence in the telephone-accessed system, the first telephone key stroke sequence being associated with the first telephone user interface programmable shortcut.

14. The method as claimed in claim 13, wherein the programming sub-step is implemented via a web-based user administration utility.

15. A telephone-accessed system for providing a telephone user interface programmable shortcut associated with a telephone key stroke sequence, comprising:

a telephone; and a server, communicatively coupled to the telephone, for storing the telephone key stroke sequence, the server configured to present a web-based user interface, the web-based user interface which receives the telephone user interface programmable shortcut for the telephone key stroke sequence, the web-based user interface including a field for receiving the telephone key stroke sequence and a second field for receiving a textual description corresponding with the telephone user interface programmable shortcut, wherein the telephone key stroke sequence is initiated by the telephone-accessed system when the telephone user interface programmable shortcut is activated via the telephone, the telephone user interface programmable shortcut consisting of two digits, the telephone user interface programmable shortcut of two digits selected from 1-9, * and #, the telephone key stroke sequence being any sequence of a plurality of digits, the plurality of digits including 1-9, * and # entered by a user, wherein the telephone key stroke sequence includes a telephone number, a change of mobility number and review of messages.

16. The telephone-accessed system as claimed in claim 15, wherein the telephone user interface programmable shortcut is assigned to the textual description.

17. The telephone-accessed system as claimed in claim 15, wherein said server provides a text-to-speech playback of the textual description descriptive name associated with the telephone user interface programmable shortcut upon activation of a first digit of the telephone user interface programmable shortcut.

* * * * *